(12) United States Patent
Hoffmann et al.

(10) Patent No.: US 11,491,991 B2
(45) Date of Patent: Nov. 8, 2022

(54) METHOD FOR DETERMINING THE DRIVE TRAIN SENSITIVITY OF A DRIVE TRAIN OF A MOTOR VEHICLE

(71) Applicant: Schaeffler Technologies AG & Co. KG, Herzogenaurach (DE)

(72) Inventors: Tobias Hoffmann, Willstaett (DE); Jan Faißt, Lahr (DE); Olaf Werner, Bühl (DE); Stefan Winkelmann, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 228 days.

(21) Appl. No.: 17/051,624

(22) PCT Filed: Apr. 9, 2019

(86) PCT No.: PCT/DE2019/100326
§ 371 (c)(1),
(2) Date: Oct. 29, 2020

(87) PCT Pub. No.: WO2019/214767
PCT Pub. Date: Nov. 14, 2019

(65) Prior Publication Data
US 2021/0229669 A1    Jul. 29, 2021

(30) Foreign Application Priority Data

May 9, 2018 (DE) ............ 10 2018 111 150.9

(51) Int. Cl.
*B60W 30/20* (2006.01)
*B60W 40/13* (2012.01)
(Continued)

(52) U.S. Cl.
CPC ............ *B60W 30/20* (2013.01); *B60W 40/13* (2013.01); *G01M 13/02* (2013.01); *B60W 2040/1392* (2013.01); *B60W 2050/0057* (2013.01)

(58) Field of Classification Search
CPC ............... B60W 30/20; B60W 40/13; B60W 2040/1392; B60W 2050/0057; G01M 13/02
See application file for complete search history.

(56) References Cited

U.S. PATENT DOCUMENTS

| 4,283,031 | A  | * | 8/1981 | Finch | ............... B61L 1/10 324/179 |
| 7,487,679 | B2 | * | 2/2009 | Sirrine | ............... G01H 1/10 73/659 |

(Continued)

FOREIGN PATENT DOCUMENTS

| CN | 1113194 A | 12/1995 |
| CN | 101644629 A | 2/2010 |

(Continued)

*Primary Examiner* — Peter D Nolan
*Assistant Examiner* — Anwar Mohamed

(57) ABSTRACT

A method for determines the drive train sensitivity of a drive train of a motor vehicle. A vehicle body is placed in longitudinal oscillations in the direction of travel and a parameter for the drive train sensitivity is determined as a function of the determined longitudinal accelerations of the vehicle body and the resultant angular accelerations of a transmission input shaft of a transmission of the motor vehicle.

14 Claims, 3 Drawing Sheets

(51) Int. Cl.
    *G01M 13/02*     (2019.01)
    *B60W 50/00*     (2006.01)

(56) References Cited

U.S. PATENT DOCUMENTS

| | | | | |
|---|---|---|---|---|
| 2004/0112707 | A1* | 6/2004 | Watt | F16H 63/067 |
| | | | | 474/10 |
| 2007/0214906 | A1* | 9/2007 | Fahland | F16H 59/38 |
| | | | | 74/331 |
| 2009/0001974 | A1* | 1/2009 | Sheiretov | G01L 5/164 |
| | | | | 324/232 |
| 2018/0162223 | A1* | 6/2018 | Alfredson | B60K 17/16 |

FOREIGN PATENT DOCUMENTS

| | | | |
|---|---|---|---|
| CN | 105074250 | A | 11/2015 |
| CN | 106233031 | A | 12/2016 |
| DE | 19628789 | A1 | 1/1998 |
| DE | 102007008613 | A1 | 8/2008 |
| DE | 102010007735 | A1 | 8/2011 |
| DE | 102012217132 | A1 | 4/2013 |
| DE | 102013204698 | A1 | 10/2013 |
| DE | 102014206183 | A1 | 10/2014 |
| DE | 102014213514 | A1 | 1/2016 |
| DE | 102014222457 | A1 | 5/2016 |
| DE | 102016124732 | A1 | 5/2017 |
| EP | 1122531 | A2 | 8/2001 |
| WO | 2015158341 | A2 | 10/2015 |

\* cited by examiner

METHOD FOR DETERMINING THE DRIVE TRAIN SENSITIVITY OF A DRIVE TRAIN OF A MOTOR VEHICLE

CROSS-REFERENCE TO RELATED APPLICATIONS

This application is the U.S. National Phase of PCT Appln. No. PCT/DE2019/100326 filed Apr. 9, 2019, which claims priority to DE 102018111150.9 filed May 9, 2018, the entire disclosures of which are incorporated by reference herein.

TECHNICAL FIELD

The disclosure relates to a method for determining the drive train sensitivity of a drive train of a motor vehicle.

BACKGROUND

It is known from DE 196 28 789 A1 for a drive train of a motor vehicle, with a vehicle body placed in longitudinal oscillations in the direction of travel, that the longitudinal speeds of the vehicle body to be determined here and the resulting angular velocities of a transmission input shaft of a transmission of the motor vehicle are parameters for a drive train sensitivity. DE 10 2016 124 732 A1 discloses a method for evaluating measurement data of a speed oscillation of an engine. DE 10 2007 008 613 A1 discloses a method according to which the rotational speed is measured at at least two different points in the drive train, wherein the measured speeds are fed to an evaluation circuit which leads to speed differences between the two measured speeds in the event of jerking oscillations occurring between the two points, and determines a clean, jerking oscillation-free speed and/or a jerking oscillation information value.

WO 2015/158341 A2 discloses a method for parameterizing a software mass damper for damping juddering oscillations in the drive train of a motor vehicle.

The drive train sensitivity of a drive train of a motor vehicle is relevant to the susceptibility to judder of a friction clutch arranged in the drive train between an internal combustion engine and a transmission. The drive train sensitivity is currently estimated using a large number of vehicle sensors or individually by test persons. Corresponding simulation models of the drive train, with which the drive train sensitivity of a given motor vehicle could be determined, have been used in recent years to determine the drive train sensitivity. However, a disadvantage of this procedure is that if there is no or only insufficient data, the parameter identification for the simulation model is associated with relatively high expenditures.

SUMMARY

It is desirable to propose a simple and objective method for determining the drive train sensitivity.

The proposed method is used to determine the drive train sensitivity of a drive train of a motor vehicle. To simplify and objectify the determination of the drive train sensitivity, a vehicle body of the motor vehicle with the drive train to be tested is placed in longitudinal oscillations in the direction of travel, and a parameter for the drive train sensitivity is determined depending on the longitudinal accelerations of the vehicle body and the resultant angular accelerations of a transmission input shaft of a transmission of the motor vehicle.

An estimate of a susceptibility to judder of a friction clutch arranged between an internal combustion engine and the transmission can be determined by means of the parameter. The parameter can be determined from the frequency dependence of the frequency of the longitudinal oscillations. For example, a linear oscillator with a predetermined eccentric mass is connected to the vehicle body to generate the longitudinal oscillations. The parameter can be determined depending on the eccentric mass. Detected angular acceleration signals of the angular acceleration can be treated using at least one order sorting filter. The parameter can be determined depending on a selected gear in the transmission. The parameter can be validated using a predetermined coherence. A frequency sweep of the longitudinal oscillations can advantageously be carried out over a predetermined number of identical oscillation periods. The longitudinal oscillations can be specified with force excitation constant over the frequency. Harmonic or non-harmonic oscillations, noise or the like can be provided to excite the longitudinal oscillations. Since the acceleration of the vehicle body and the relevant forces are decisive for determining the drive train sensitivity, the mass of the longitudinal oscillator can be variably specified to generate the corresponding forces.

In other words, the drive train sensitivity can be provided for estimating the susceptibility to judder of a motor vehicle or a drive train of a motor vehicle. According to equation 1, the drive train sensitivity $SF_{zg}$ denotes the transmission behavior between the torque modulation $M_{exc,Cl}$ of a slipping friction clutch and an acceleration amplitude $aF_{zg}$ of the motor vehicle that results or can be felt by the driver:

$$S_{Fzg} = \frac{a_{Fzg}}{M_{exc,ci}} 1 \qquad \text{Eqn. 1}$$

A direct determination of the drive train sensitivity according to equation 1 usually fails because measuring the acting torque modulation on the friction clutch or providing a targeted, constant and known clutch excitation (normal judder) is not practicable or involves considerable effort.

The following procedure is therefore proposed:

For a mechanical system, the system behavior can be completely described by the following equation of motion:

$$\underline{M} \cdot \ddot{\vec{x}}(t) + \underline{D} \cdot \dot{\vec{x}}(t) + \underline{K} \cdot \vec{x}(t) = \vec{F}(t) \qquad \text{Eqn. 2}$$

In the case of drive train sensitivity, the question arises—in the context of the equation of motion—of how a system will react to a given force/torque excitation. Considering only periodic excitations, the equation of motion of equation 2 can be changed by the solution to equation 3

$$\vec{x}(t) = \hat{\vec{x}} \cdot e^{j\Omega t} \qquad \text{Eqn. 3}$$

to the equation of motion of equation 4:

$$\hat{\vec{x}}(\Omega) = \frac{(-\Omega^2 \cdot \underline{M} + j\Omega \cdot \underline{D} + \underline{K})^{-1} \vec{F}(\Omega)}{\underline{G}(\Omega)} \qquad \text{Eqn. 4}$$

As can be seen from this equation, the transmission behavior of the system at a given excitation frequency can be clearly described using the frequency response matrix $\underline{G}(\Omega)$. Due to the symmetry properties of the underlying system matrices, the frequency response matrix itself is symmetrical. Therefore, according to equation 5:

$$\underline{G} = \begin{pmatrix} G_{1,1} & \cdots & G_{1,n} \\ \vdots & \ddots & \vdots \\ sym. & \cdots & G_{n,n} \end{pmatrix} \quad \text{Eqn. 5}$$

This basic symmetrical property of a mechanical system according to equation 5 can be used to implement the proposed method for determining the drive train sensitivity. A model with two masses that are elastically coupled to one another is to be assumed, wherein one of the masses is elastically coupled to a very large mass or to the housing. Using equation 5, this model gives the following results from equation 6

$$\begin{pmatrix} \hat{x}_1 \\ \hat{x}_2 \end{pmatrix} = \begin{pmatrix} G_{1,1} & G_{1,2} \\ sym. & G_{2,2} \end{pmatrix} \cdot \begin{pmatrix} \hat{F}_1 \\ \hat{F}_2 \end{pmatrix} \quad \text{Eqn. 6}$$

If this model is excited with a force, two configurations result according to equation 7:

$$\begin{pmatrix} \hat{x}_1 \\ \hat{x}_2 \end{pmatrix} = \begin{pmatrix} G_{1,1} \\ G_{1,2} \end{pmatrix} \cdot \hat{F}_1 \text{ and} \quad \text{Eqn. 7}$$

$$\begin{pmatrix} \hat{x}_1 \\ \hat{x}_2 \end{pmatrix} = \begin{pmatrix} G_{1,2} \\ G_{2,2} \end{pmatrix} \cdot \hat{F}_2 \quad \text{Eqn. 8}$$

As can easily be seen from this example, the same transfer function G1,2 can be determined in two different ways. In the first case by excitation of the first mass and observation of the second mass and in the second case by excitation of the second mass and observation of the first mass. Correspondingly, when the friction clutch is excited with a longitudinal acceleration of the vehicle that feels uncomfortable to the driver, the desired transfer function can be determined in the opposite manner by excitation of the longitudinal acceleration of the motor vehicle and observation of the torsional transmission input acceleration.

For this purpose, a longitudinal accelerator, for example an imbalance, a linear motor, an air pressure-operated knocker or the like is rigidly attached to the vehicle body, for example to a seat holder or the like. For example, two counter-rotating eccentric masses can be provided as force excitation. The maximum force is set by different eccentric dimensions and a speed limit. This means that a defined power excitation with a preferably moving vehicle and a measurement of the torsional transmission input acceleration by numerically deriving the measured speed curve allows the desired transfer function to be determined directly at the corresponding operating point of the friction clutch with little experimental effort and a limited number of sensors.

BRIEF DESCRIPTION OF THE DRAWINGS

The method is explained in more detail with reference to the exemplary embodiment shown in FIGS. 1 to 7. In the figures.

DETAILED DESCRIPTION

Figure 1:
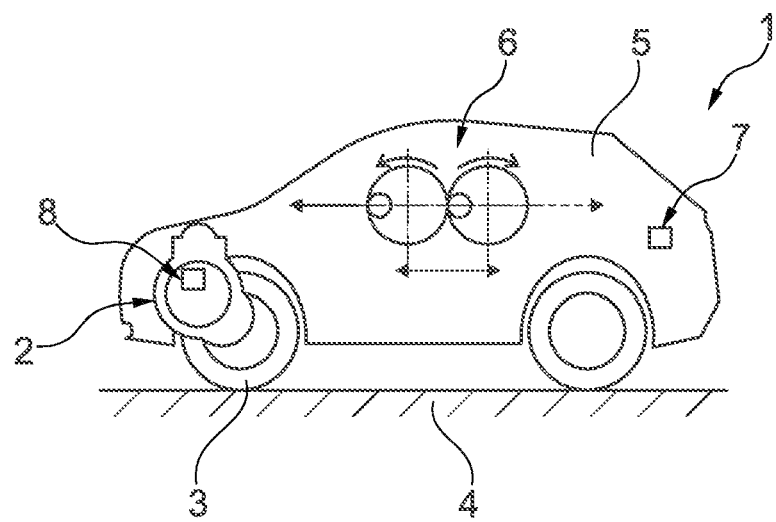
FIG. 1 shows a schematic illustration of a motor vehicle for carrying out the method.

FIG. 1 shows a schematic representation of the motor vehicle 1 for determining the drive train sensitivity of the drive train 2 here a front transverse installation with the driven wheels 3. When the motor vehicle 1 is driving on the roadway 4 in the direction of travel, the vehicle body 5 is excited to longitudinal oscillations along the direction of travel by means of the linear oscillator 6. The longitudinal oscillations are detected by means of the acceleration sensor 7 and correlated with the angular accelerations determined from the speed sensor 8 of the transmission input shaft of the drive train 2. From this, the drive train sensitivity and a susceptibility to judder of a friction clutch arranged in the drive train 2 are determined.

Figure 2:
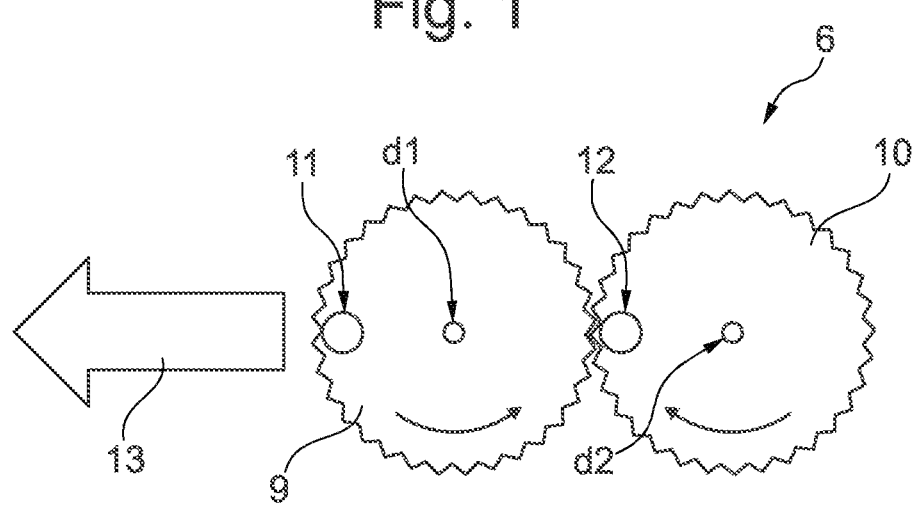
FIG. 2 shows a schematic illustration of an exemplary embodiment of a linear oscillator.

FIG. 2 shows a schematic illustration of the linear oscillator 6 of FIG. 1. The two interlocked eccentric discs 9, 10 are arranged such that they can be rotated about the axes of rotation d1, d2 and are rotationally driven, for example, by at least one DC motor. The eccentric discs 9, 10 have eccentric masses 11, 12 arranged eccentrically to the axes of rotation d1, d2, so that when the rotary drive is used, this results in a linear force in the direction of the arrow 13, which corresponds to the direction of travel of the motor vehicle 1 in FIG. 1. The two counter-rotating eccentric masses 11, 12 are used as force excitation, wherein the maximum force is set by different eccentric masses and a speed limitation.

Figure 3:
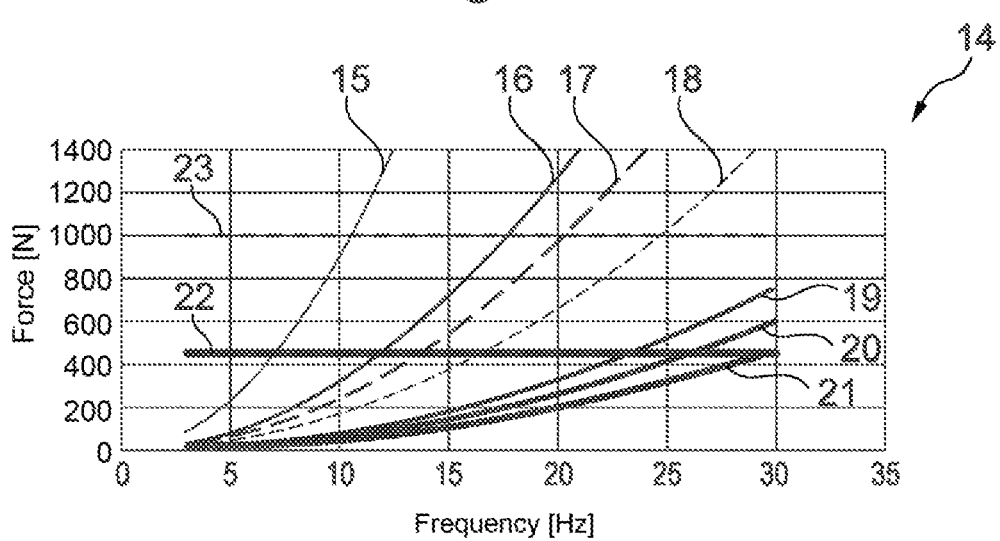
FIG. 3 shows characteristic excitation curves for different oscillating masses.

FIG. 3 shows the diagram 14 with the characteristic curves 15, 16, 17, 18, 19, 20, 21, which show the force of the excitation of the drive train via the frequency with different masses of the linear oscillator. The horizontal line 22 shows the desired excitation, and the horizontal line 23 shows the maximum desired excitation. The masses are between 0.073 kg of the characteristic curve 21 and 1.27 kg of the characteristic curve 15. An acceleration amplitude on the motor vehicle of 0.3 m/s2 is perceived by most drivers and is defined here as the minimum acceleration amplitude. Usual vehicle masses from 1500 kg to 3000 kg therefore require a force excitation from 500 N to 1000 N. The transfer function in the motor vehicle is preferably determined for a frequency range from 3 Hz to 30 Hz.

A massive increase in force excitation can lead to falsifications of the transfer function due to non-linear stiffness. To enable a uniform, slow speed ramp and thus a quasi-static evaluation of the frequencies, two DC motors can be adapted as drives to the two axes of rotation d1, d2 (FIG. 2). A slow increase in speed or a slow decrease in speed is advantageous so that the natural frequencies can develop in sufficient time.

Figure 4:
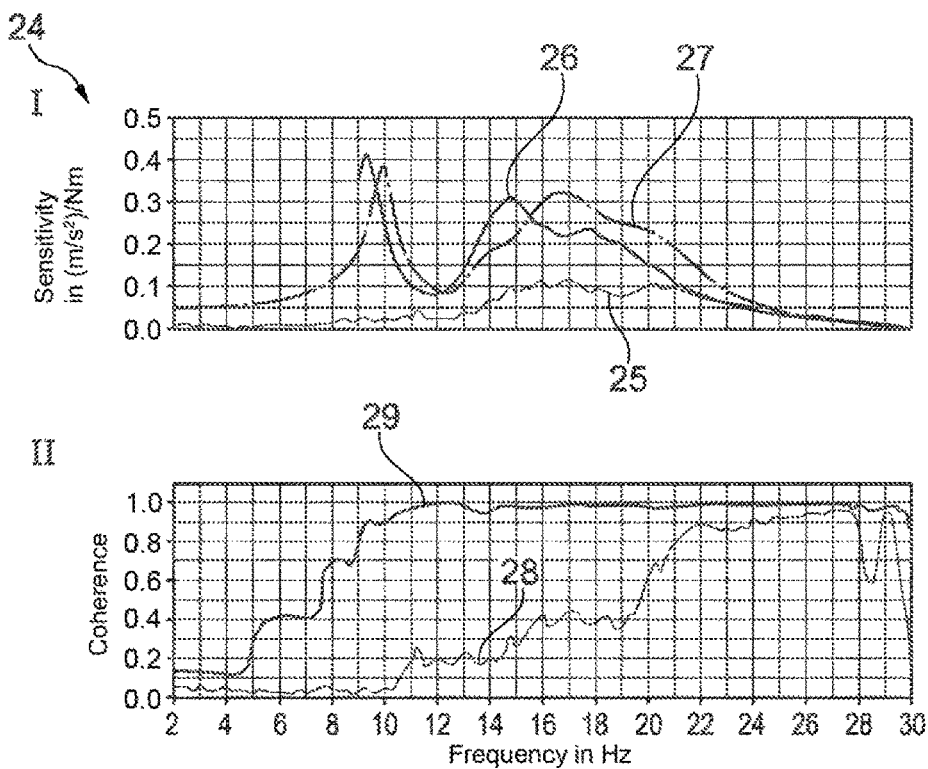
FIG. 4 shows a diagram of drive train sensitivities and associated coherences for a given oscillating mass.

FIG. 4 shows the diagram 24 with partial diagrams I and II. The partial diagram I shows the sensitivity of the drive train to the frequency of the linear oscillator for a given mass of 0.45 kg. The curve 25 shows a real measurement without an order sorting filter, the curve 26 shows a real measurement using an order sorting filter and the curve 27 shows a simulation result. It can be seen that unadjusted eigenmodes and interference components falsify the measurements and that order sorting filters are preferably used in the measurement of the angular accelerations of the transmission input shaft.

The partial diagram II uses the curves 28, 29 to show the coherence of the curves 25, 26 over the frequency. The coherence is to be understood as a measure of the degree of linear dependency of the input to the output signal and is defined in the value range from zero to one. A coherence of one means that there is a complete linear dependency between input and output signals. Coherence is therefore a suitable measure for assessing whether the measured signals are suitable for identifying the system behavior of a linear time-invariant system with the aid of linear system theory. For practical use, a coherence of >0.75 is sufficient to be able to determine a reliable transfer function from the measured signals. The reasons for a coherence deviating from one are generally:

non-linear system behavior,
influence on the output signal by other signals that do not correlate with the input signal,
uncorrelated noise of the input/output signal,
leak effects due to insufficient frequency resolution.

The curve 29 therefore shows the clearly improved coherence of a signal curve of the angular acceleration with application of order sorting filters compared to the signal behavior shown in the curve 28 without an order sorting filter.

Figure 5:
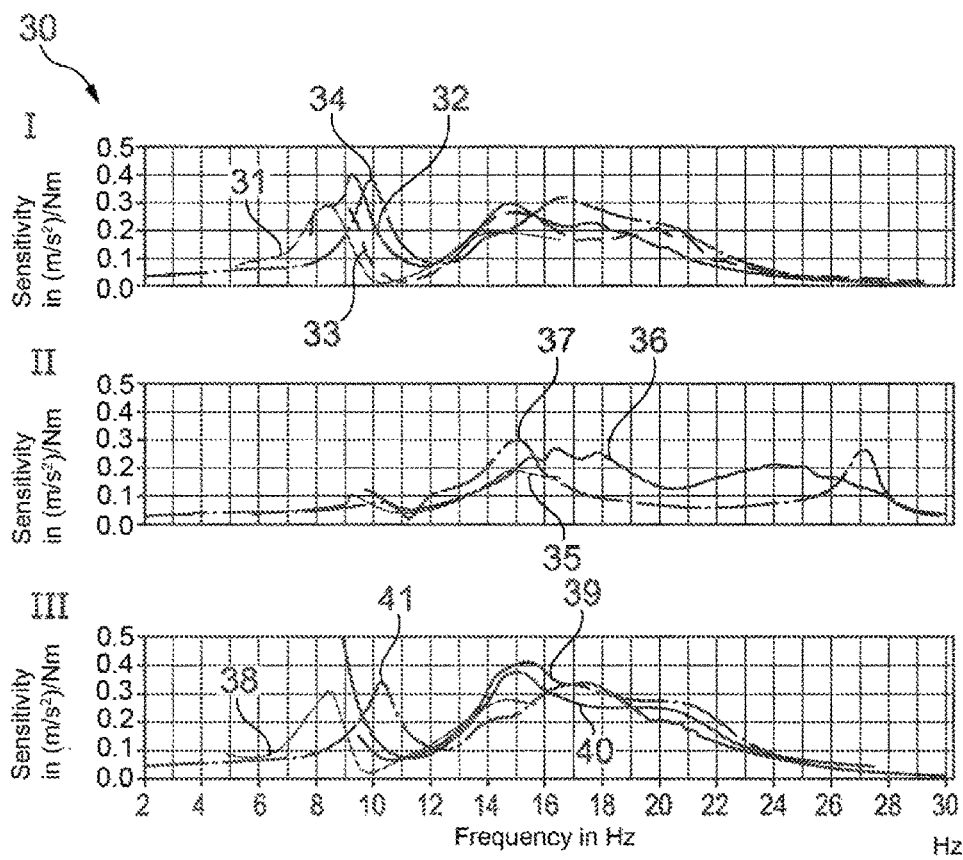
FIG. 5 shows a diagram of drive train sensitivities with different oscillating masses and gears engaged in the transmission.

FIG. 5 shows the diagram 30 with partial diagrams I, II, III. The partial diagram I shows the sensitivity of a drive train when the first gear is engaged. The curve 31 is based on a mass of 1.2 kg, the curve 32 on a mass of 0.45 kg and the curve 33 on a mass of 0.3 kg. For comparison, the curve 34 shows a simulation of the drive train.

The partial diagram II shows the sensitivities of the drive train with a second gear engaged with the curve 35 with a mass of 1.2 kg, with the curve 36 with a mass of 0.45 kg and the curve 37 with a simulation.

The partial diagram III shows the drive train with a reverse gear engaged. The curve 38 shows the sensitivity with a mass of 1.2 kg, the curve 39 with a mass of 0.45 kg, the curve 40 with a mass of 0.3 kg and the curve 41 with a simulation.

The respective deviations from the simulations of the measured sensitivities, for example at 15 Hz, are due to the excessive or non-constant force amplitudes.

Figure 6:
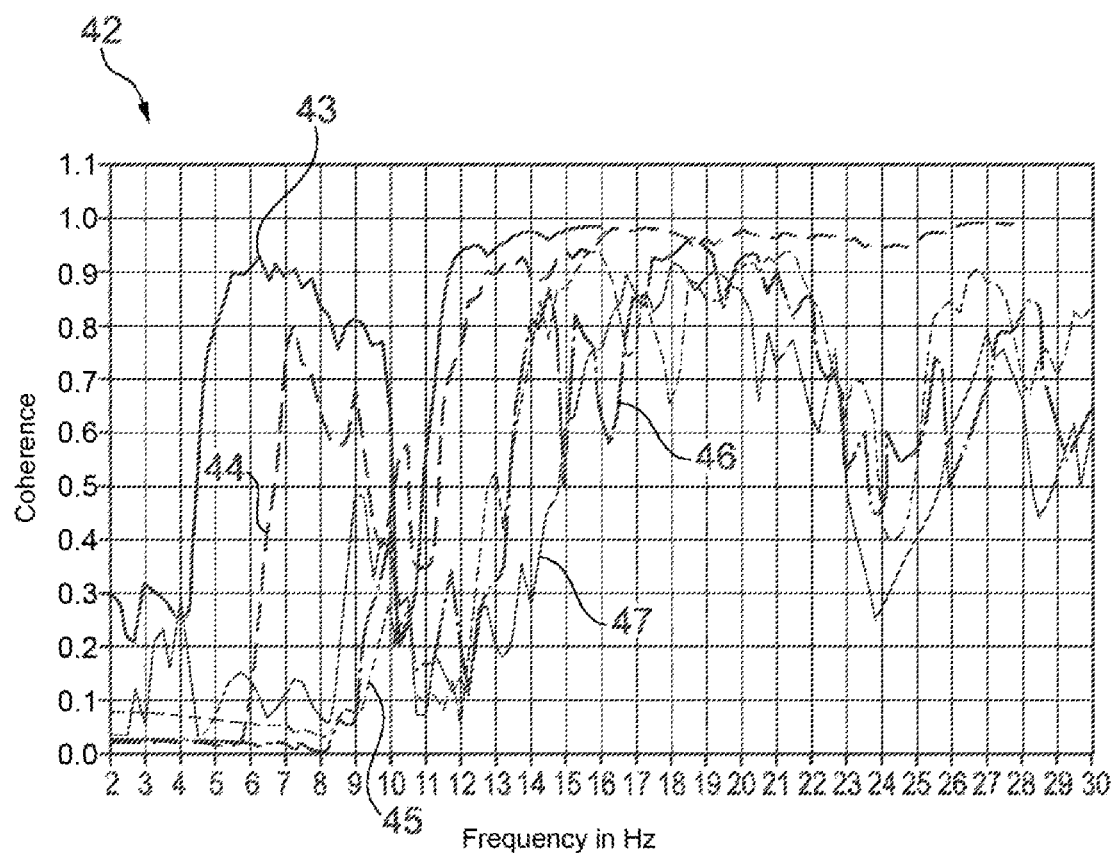
FIG. 6 shows a diagram of the coherences of determined drive train sensitivities with different oscillating masses and FIG. 7 shows a diagram of an improved excitation for determining the transfer function.

FIG. 6 shows the diagram 42 with the curves 43, 44, 45, 46, 47 of the coherence over the frequency with different masses. The curve 43 shows the coherence with a mass of 1.2 kg, the curve 44 with a mass of 0.45 kg, the curve 45 with a mass of 0.117 kg, the curve 46 with a mass of 0.095 kg and the curve 47 with a mass of 0.073 kg.

FIG. 6 shows which force amplitudes a linear oscillator must provide to generate an evaluable reaction on the transmission input shaft. Table 1 shows assessment criteria for evaluability based on the coherence of the measured sensitivities. A reliable evaluation of a measured transfer function with a coherence of $\lambda \geq 0.8$ is assumed. Here, a motor vehicle with a mass of approximately 1500 kg is assumed. From a force amplitude of 210 N, the transfer function in the frequency range from 3 Hz to 30 Hz can be evaluated according to Table 1. Extrapolated to higher vehicle masses, this means that with a force amplitude of 400 N motor vehicles up to approx. 3000 kg would be sufficiently excitable by a linear oscillator.

TABLE 1

| Eccentric mass | Frequency @ $\lambda \approx 0.8$ | Force @ $\lambda \approx 0.8$ | Frequency @ 450 N |
|---|---|---|---|
| 0.073 kg | 16.3 Hz | 138 N | 30 Hz |
| 0.095 kg | 17.77 Hz | 190 N | 26 Hz |
| 0.117 kg | 14.11 Hz | 166 N | 23 Hz |
| 0.45 kg | 7.26 Hz | 168 N | 12 Hz |
| 1.2 kg | 4.97 Hz | 210 N | 7 Hz |

Figure 7:
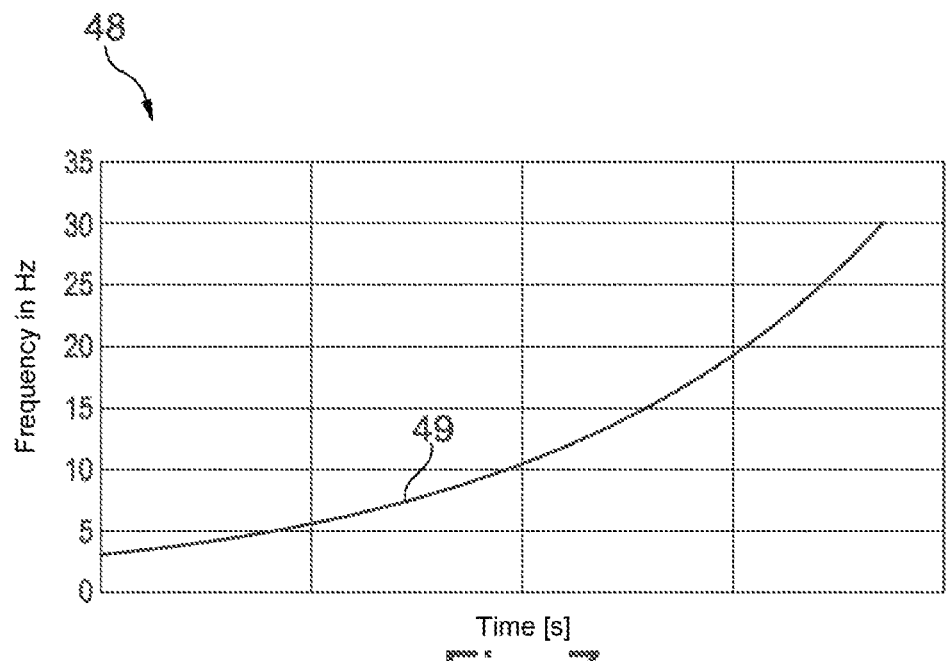

FIG. 7 shows the diagram 48 of the frequency over time with an optimized frequency sweep of a linear oscillator. To form a robust evaluation, the same number of measurement periods is excited for all frequencies, so that a longer time is provided at small frequencies than at higher frequencies, and a frequency curve shown in the curve 49 is produced.

Furthermore, constant force excitation is proposed, which contributes to an improvement in the transfer function. The reason for this is that in the case of constant excitation, the non-linearities of stiffnesses and non-linearities of damping have less influence on the transfer function. All of the measurement improvements mentioned here are possible with a linear oscillator with constant force excitation and a freely configurable frequency response.

LIST OF REFERENCE SYMBOLS

1 Motor vehicle
2 Drive train
3 Wheel
4 Roadway
5 Vehicle body
6 Linear oscillator
7 Acceleration sensor
8 Speed sensor
9 Eccentric disc
10 Eccentric disc
11 Eccentric mass
12 Eccentric mass
13 Arrow
14 Diagram
15 Characteristic curve
16 Characteristic curve
17 Characteristic curve
18 Characteristic curve
19 Characteristic curve
20 Characteristic curve
21 Characteristic curve
22 Line
23 Line
24 Diagram
25 Curve
26 Curve
27 Curve
28 Curve
29 Curve
30 Diagram
31 Curve
32 Curve
33 Curve
34 Curve
35 Curve
36 Curve
37 Curve
38 Curve
39 Curve
40 Curve 41 Curve
42 Diagram
43 Curve
44 Curve
45 Curve
46 Curve
47 Curve
48 Diagram
49 Curve
I Partial diagram
II Partial diagram
III Partial diagram
d1 Axis of rotation
d2 Axis of rotation

The invention claimed is:

1. A method for determining a drive train sensitivity of a drive train of a motor vehicle, wherein a vehicle body is placed in longitudinal oscillations in a direction of travel and, depending on longitudinal accelerations of the vehicle body and angular accelerations of a transmission input shaft of a transmission of the motor vehicle, a parameter for the drive train sensitivity is determined, wherein the drive train sensitivity denotes transmission behavior between a torque modulation of a slipping friction clutch and an acceleration amplitude of the motor vehicle that the driver can feel, wherein a linear oscillator with at least one eccentric mass is connected to the vehicle body to generate the longitudinal oscillations.

2. The method according to claim 1, wherein the parameter is used to determine an estimate of a susceptibility to judder of a friction clutch arranged between an internal combustion engine and the transmission.

3. The method according to claim 1, wherein the parameter is determined from the frequency dependence of the frequency of the longitudinal oscillations.

4. The method according to claim 1, wherein the parameter is determined depending on the at least one eccentric mass.

5. The method according to claim 1, wherein detected angular acceleration signals of the angular acceleration are treated by means of at least one order sorting filter.

6. The method according to claim 1, wherein the parameter is determined depending on a selected gear in the transmission.

7. The method according to claim 1, wherein the parameter is validated by means of a predetermined coherence.

8. The method according to claim 1, wherein a frequency sweep of the longitudinal oscillations is carried out over a predetermined number of identical oscillation periods.

9. The method according to claim 1, wherein the longitudinal oscillations are predetermined with force excitation that is constant over the frequency.

10. A method of determining a drive train sensitivity of a motor vehicle, the method comprising:
    connecting a linear oscillator with at least one eccentric mass to a body of the motor vehicle to generate oscillations in a longitudinal direction;
    placing the vehicle in motion in the longitudinal direction;
    varying a frequency of the linear oscillator over a range of frequencies; and
    measuring angular accelerations of a transmission input shaft.

11. The method of claim 10 further comprising treating the angular acceleration measurements using an order sorting filter.

12. The method of claim 10 further comprising repeating the varying of the frequency and the measuring of the angular acceleration with a transmission in a different gear state.

13. The method of claim 10 further comprising attaching a different eccentric mass to the linear oscillator and repeating the varying of the frequency and the measuring of the angular acceleration.

14. The method of claim 10 wherein the range of frequencies includes 3 Hz and 30 Hz.

* * * * *